Sept. 21, 1926.
W. E. O'BRIEN
SAFETY FENDER
Filed March 19, 1926
1,600,423
6 Sheets-Sheet 1
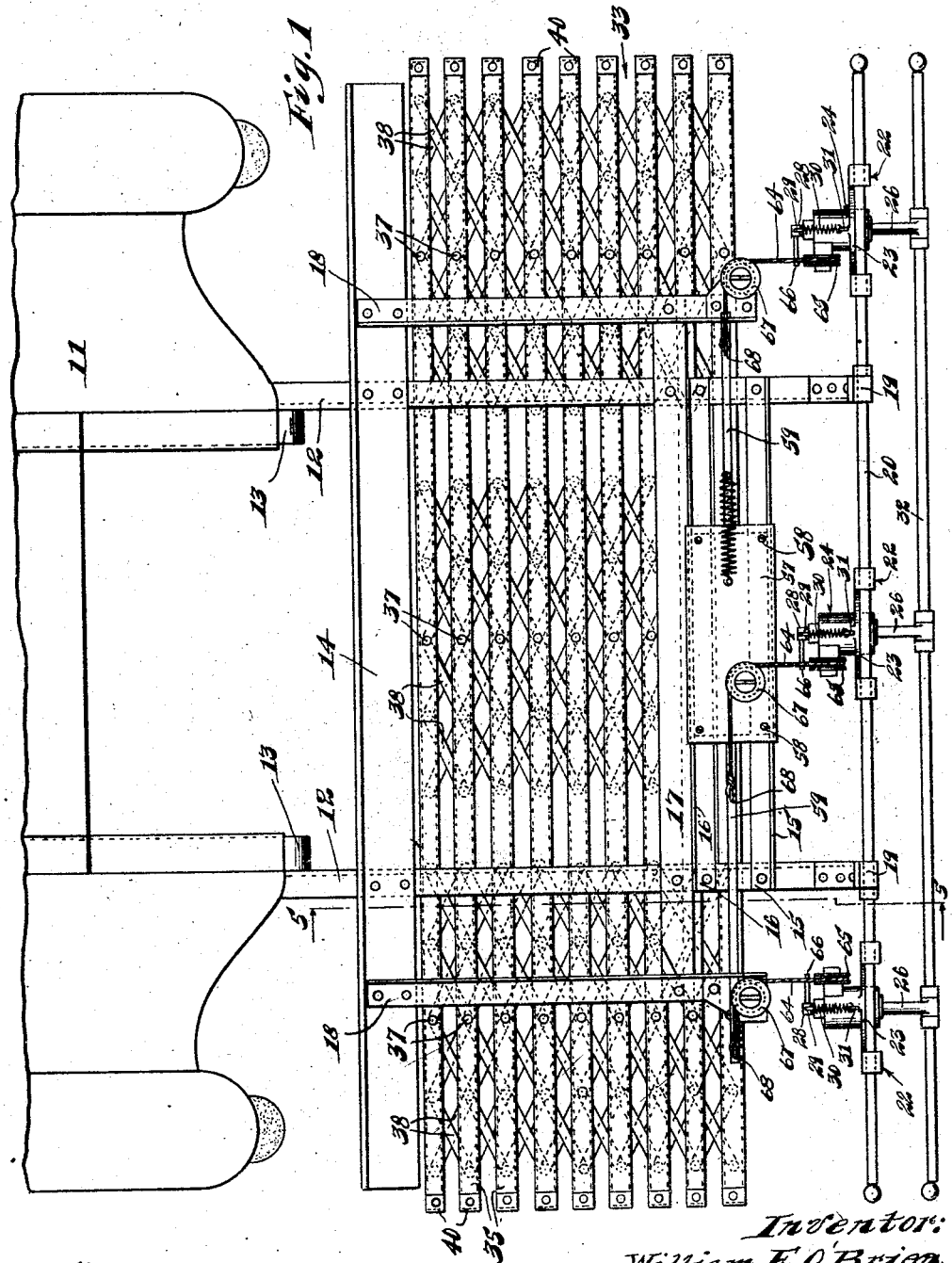

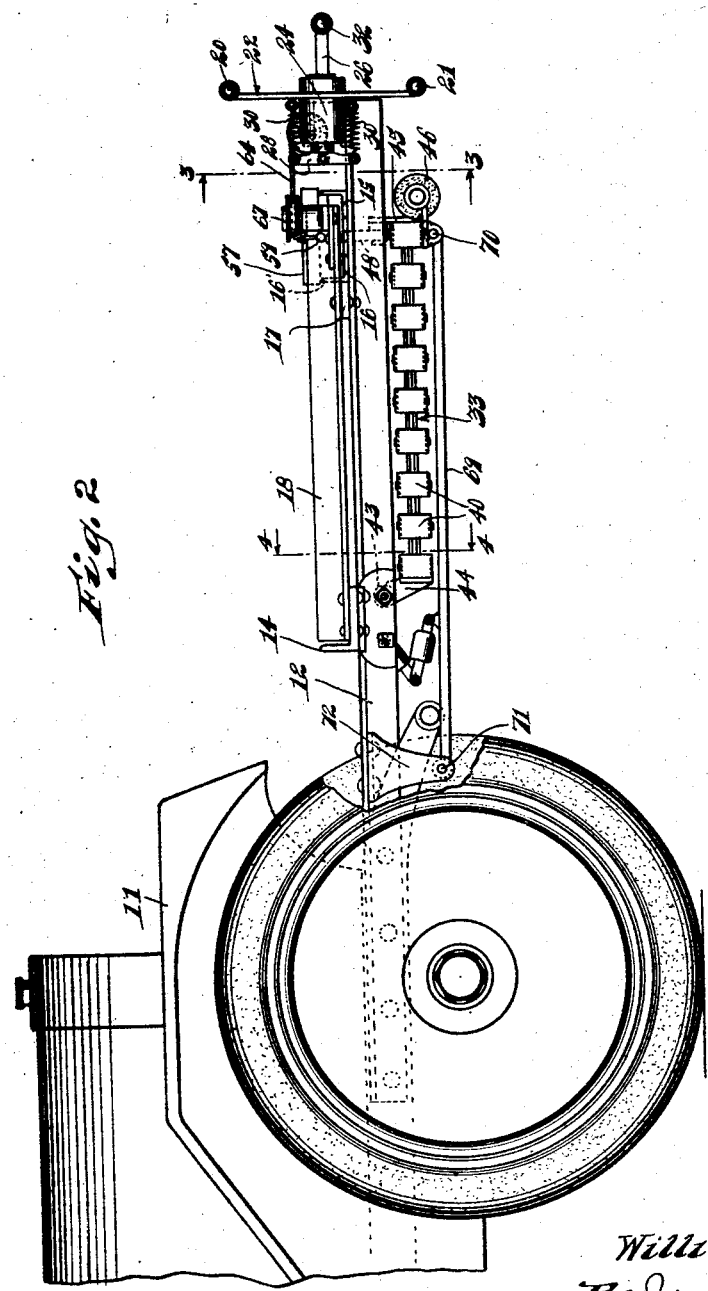

Sept. 21, 1926.
W. E. O'BRIEN
SAFETY FENDER
Filed March 19, 1926
1,600,423
6 Sheets-Sheet 3
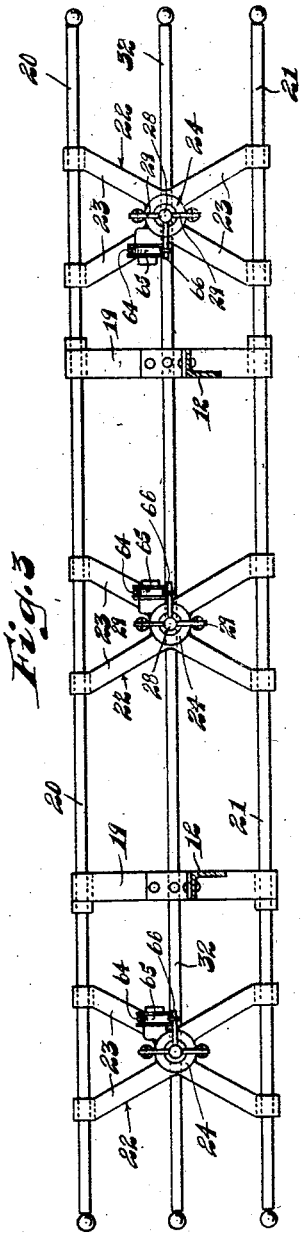
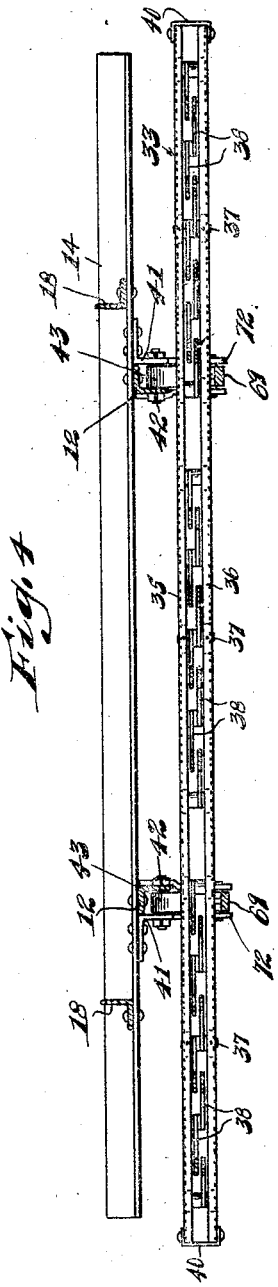

Sept. 21, 1926.  
W. E. O'BRIEN  
SAFETY FENDER  
Filed March 19, 1926  
1,600,423  
6 Sheets-Sheet 4
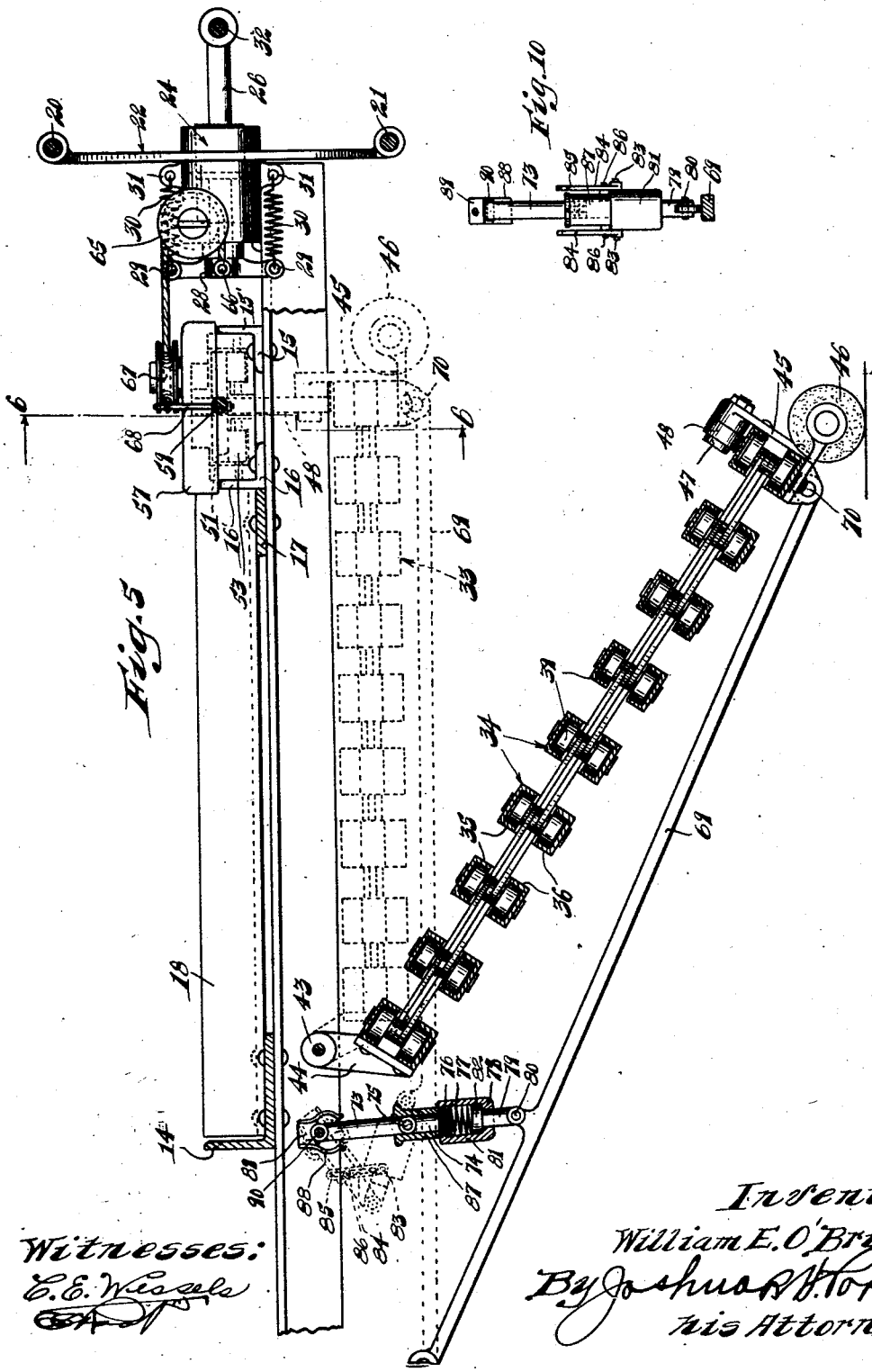
Witnesses:
Inventor:  
William E. O'Brien,  
By Joshua R. H. Potts  
his Attorney.

Sept. 21, 1926.
W. E. O'BRIEN
SAFETY FENDER
Filed March 19, 1926  6 Sheets-Sheet 5
1,600,423
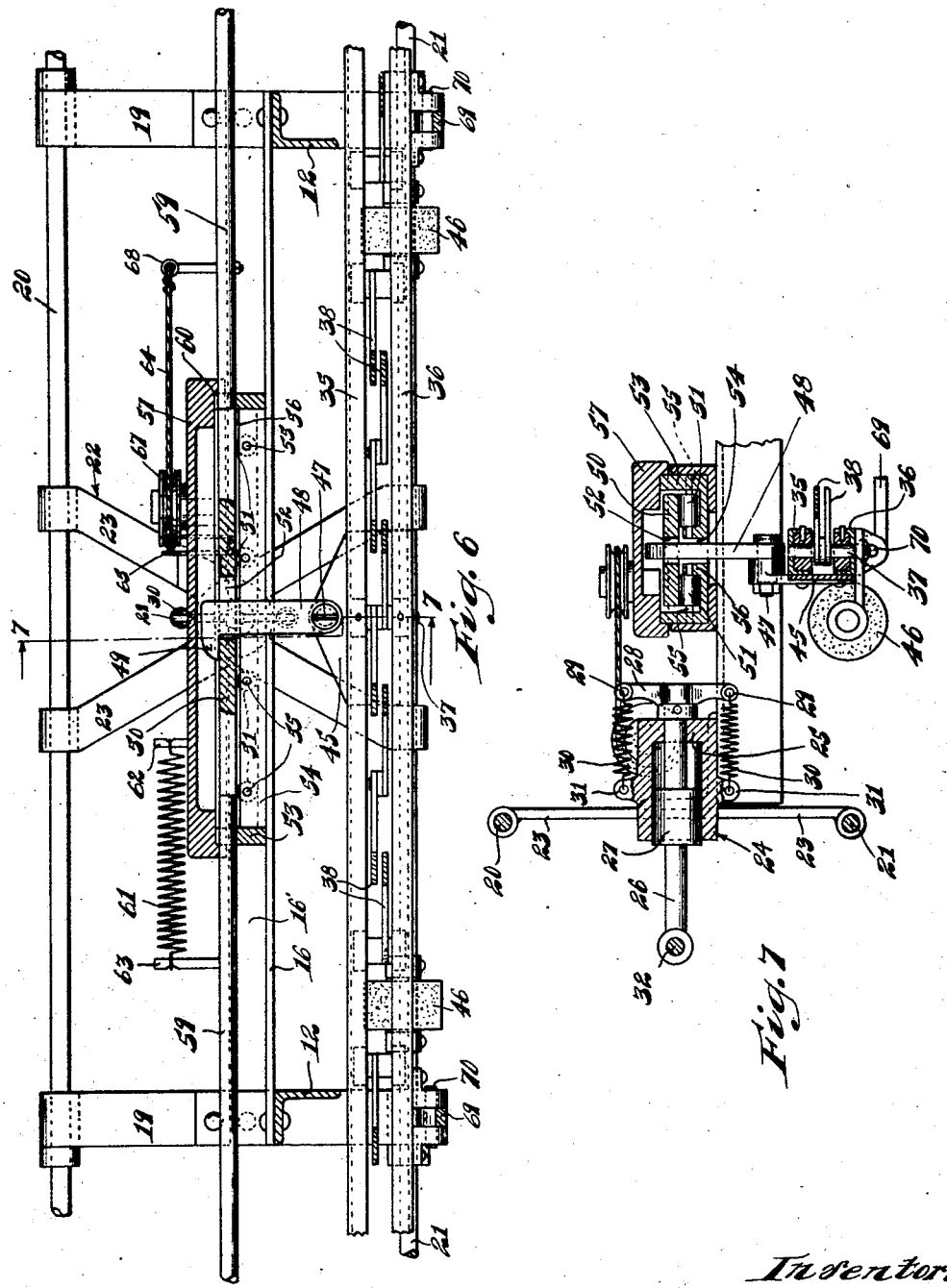
Witnesses:
C. E. Wessels
Inventor:
William E. O'Brien,
By Joshua ...
his Attorney.

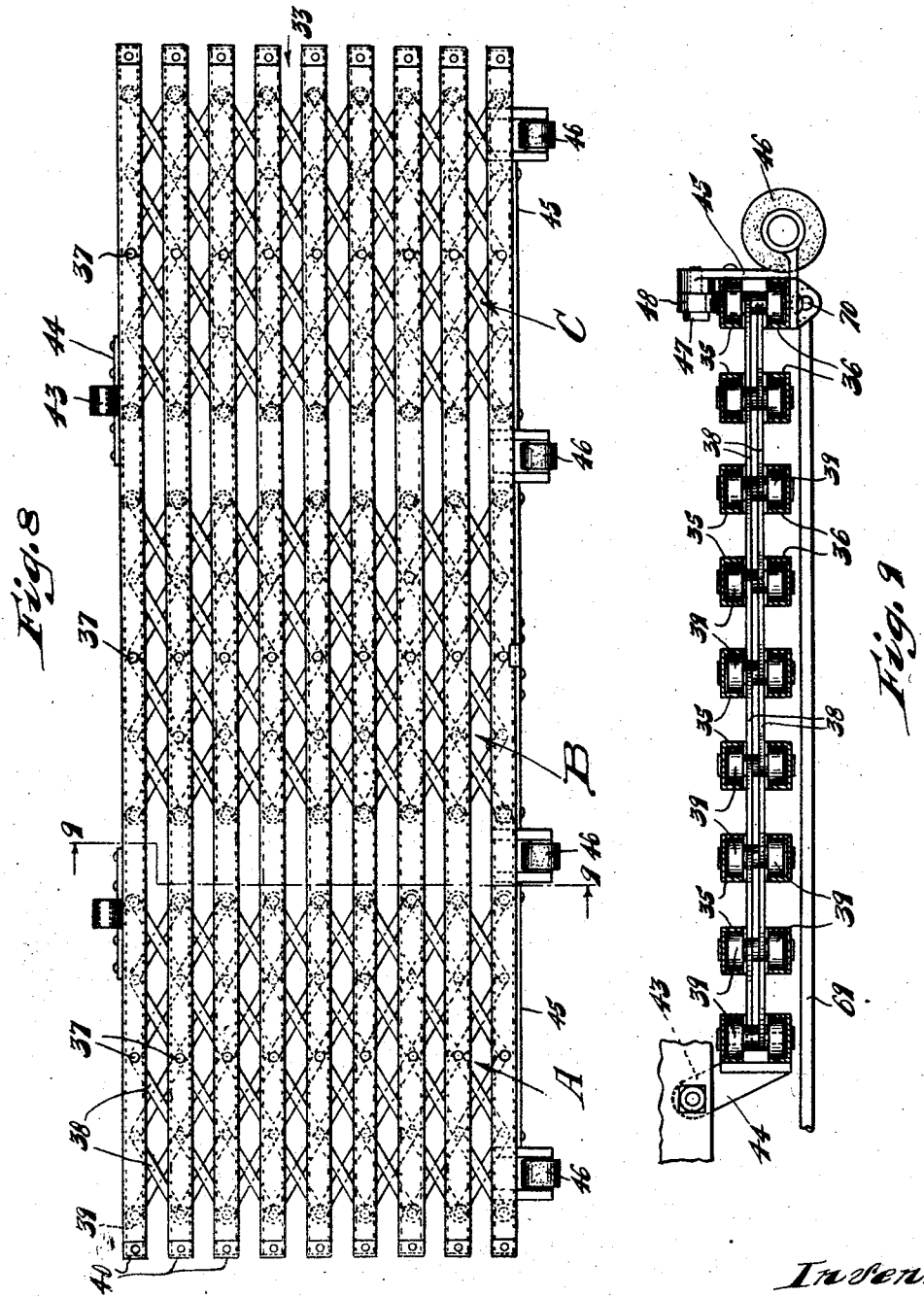

Patented Sept. 21, 1926.

1,600,423

UNITED STATES PATENT OFFICE.

WILLIAM E. O'BRIEN, OF SUMMIT, ILLINOIS.

SAFETY FENDER.

Application filed March 19, 1926. Serial No. 95,854.

My invention relates to safety fenders for motor vehicles and the same has for its main object to provide an improved construction of this kind for use in front of motor vehicles to prevent or lessen injury to pedestrians in the event of collision.

Another object is to provide an improved construction of this character, in which the parts are so arranged that the impact of collision will automatically cause a safety gate structure to drop to the roadway for the protection of the pedestrian.

A further object of the invention is to provide an improved construction of means for attaining the foregoing objects through an arrangement of bumpers designed to protect the car in case of a collision with another vehicle or with an unyielding object, one of the bumpers comprising an advance impact member mounted for yielding movement and controlling connections whereby upon impact with an object, to effect the release of the safety gate structure.

Other objects will appear hereinafter.

The invention consists in the combinations and arrangements of parts hereinafter described and claimed.

The invention will be best understood by reference to the accompanying drawings forming a part of this specification, and in which, Fig. 1 represents a top plan view of a safety fender made in accordance with the present invention;

Fig. 2 represents a side elevational view showing the fender applied to an automobile and showing it in elevated position;

Fig. 3 is a cross section through the fender, this view being taken substantially on the line 3—3 of Fig. 2;

Fig. 4 is another cross section through the fender, this view being taken on the line 4—4 of Fig. 2;

Fig. 5 represents an enlarged section taken substantially on the line 5—5 of Fig. 1 and showing the gate structure in full lines as it appears when dropped into protective position;

Fig. 6 shows a cross section through the fender on the line 6—6 of Fig. 5;

Fig. 7 represents a detail sectional view taken on the line 7—7 of Fig. 6;

Fig. 8 represents a top plan of the gate structure detached from the fender;

Fig. 9 represents a cross section through the gate structure, this view being taken on the line 9—9 of Fig. 8; and Fig. 10 represents a sectional detail of the means whereby to lock the safety fender in protective position.

Referring with more particularity to the accompanying drawings, wherein I have illustrated the preferred embodiment of my safety fender in connection with the front portion 11 of an automobile, it will be seen that 12, 12 represent fender beams which project in front of the car and which are supported upon the chassis side frames 13, 13. Secured to and connecting the fender beams 12, 12 at points just in front of the side frames 13, 13 is a cross piece 14; and also secured to and connecting the said fender beams 12, 12 at appropriate points back of the forward extremities thereof are cross pieces 15, 16 and 17. The fender beams 12, 12 and the cross pieces 14, 15 and 16 are preferably made of angle-iron, while the cross piece 17 consists of a plate. As clearly shown in the drawings, the cross pieces 15 and 16 are placed so that their upstanding flanges 15' and 16', respectively, are in remote relation for the appropriate securement of the housing structure to be hereinafter described. The cross pieces 14 and 17 are connected by suitable side sills 18, 18 which are also preferably made of angle-iron. In this manner I preferably provide frame means for my safety fender, which frame means are supported in front of the automobile.

Secured to the front ends of the fender beams 12, 12 are vertically-extending supports 19, 19. As clearly illustrated in Figs. 3 and 6, the supports 19, 19 carry a top bumper 20 above the lines of the fender beams and a bottom bumper 21 below the lines of the same. At appropriate intervals the top and bottom bumpers 20 and 21 are connected by spider frames 22 each of which comprises sets of arms 23 extending upwardly and downwardly from a cylinder structure 24. Each of the cylinder structures 24 has a closed rear end 25 through which is centrally taken a plunger 26 furnished with a piston 27 slidably fitting within the cylinder as best illustrated in Fig. 7. Each plunger 26 is furnished at its rear end with a cross head 28 whose extremities 29 are connected by pull springs 30 with suitable lugs 31 for the purpose on the cylinder structure. The plungers 26, thus operatively arranged in the cylinder structures, are normally urged by the pull springs 30 into position for supporting an impact bumper 32 in advance of the fixed top and bottom bumpers 20 and 21, respectively. As illustrated in the drawings, the impact bumper 32 is secured to the forward ends of the plungers 26 so that it will be positioned in advance of the parts making up the fender construction and it will be the first to strike an object in the roadway in front of the automobile. By this arrangement, the impact bumper 32 is mounted for yielding movement relatively to the bumpers 20 and 21; and provision is made whereby the yielding movement of the impact bumper may be employed as means for releasing a safety gate structure 33 which is normally supported under the fender beams so as to drop into protective position upon the roadway.

By reference to the drawings, especially to Figs. 1, 5, 8 and 9, it will be seen that the gate structure 33 is composed of a series of pairs 34 of channel bars, the component members 35 and 36 of each pair being arranged in confronting relation and being connected at spaced intervals by studs 37 on which are mounted the jointed bars 38. The pairs 34 of channel bars are connected by the jointed bars 38 which are equipped at their extremities with rollers 39 having turning fit in the channel bars whereby after the fashion of lazy-tong constructions, the gate structure is adapted limitedly to be extended and contracted. As best illustrated in Figs. 1 and 8, I preferably provide three sections A, B and C of jointed bar structures, the jointed bars 38 making up each section being arranged upon a row of pivot studs 37. The extremities of each pair 35, 36 of channel bars are connected by suitable clip elements 40. The gate structure thus produced is pivoted at one end to the fender beams 12, 12 as by means of angular bracket members 41, hinge pins 42 and hinge knuckles 43, it being observed in Fig. 4 that the angular brackets 41 are secured to the cross member 14 and that the hinge knuckles 43 are engaged on the hinge pins 42 between the angular brackets 41 and fender beams 12. The hinge knuckles 43 are formed on angular brackets 44 (Figs. 5 and 8) which are secured to the end members 35 and 36 forming the rearmost pair of channel bars. To the members 35 and 36 at the front end of the gate structure are secured brackets 45 carrying suitable traction elements 46 adapted to turn on the roadway when the gate structure is in protective position as illustrated in Fig. 5. Swiveled on a pin 47 carried by one of the brackets 45 is a latch member 48 having a hook 49 formed at its top end, which hook member when the gate structure is in elevated position as illustrated in Fig. 5, is adapted to engage over the top surface of a transversely-extending plate 50 mounted on rollers 51 for transverse shifting movement, it being observed (Figs. 6 and 7) that the plate 50 is provided with an aperture 52 through which the hooked end of the latch is taken. The plate 50 slidably fits within a housing 53 which is positioned upon the cross members 15, 16 and between the respective flanges 15', 16' thereof, there also being an aperture 54 in the bottom of such housing for accommodating the passing of the hooked latch 48. As best seen in Fig. 6, the rollers 51 are operatively mounted on spindles 55 fixed in the side walls of the housing 53 and in suitable lugs 56 upstanding from the bottom of said housing. 57 designates a top closure for the housing and the same is secured thereon as by screws 58. Transversely extending plate 50, mounted upon the rollers 51, is made with oppositely projecting arms 59 which have sliding fit in suitable apertures 60 in the ends of the housing. The plate 50 with its oppositely projecting arms 59 constitutes a shiftable element which is normally held in position for the hooked latch to be engaged thereon by means of a pull spring 61 connected at one end to a post 62 upon the closure 57 and at the other end to a post 63 attached to one of the arms 59. The gate structure, therefore, is supported in elevated position under the fender beams by engaging the hooked latch upon the shiftable element. By this arrangement, it will be evident that upon withdrawing the shiftable element from the hooked latch, the gate structure will drop to the roadway to occupy the inclined position illustrated in Fig. 5 and that by its own weight it will be extended forwardly and downwardly as it drops.

Means are provided whereby the gate structure will be released to fall into protective position whenever the impact bumper 32 strikes a pedestrian or an object in the roadway. This means includes cable members 64, of which there is one for each of the cylinder structures 24. Upon each of the cylinder structures 24 is operatively mounted a pulley 65 and from each of the plunger cross heads 28 there projects an arm 66. Now, each cable 64 is attached at one end to its corresponding arm 66, passes over its corresponding pulley 65 and thence passes over a guiding pulley 67 after which it is attached as by means of an eye screw 68 to an arm of the shiftable element.

From an inspection of Fig. 1, it will be seen that the guiding pulleys 67, which are located near the opposite sides of the construction, are suitably mounted upon the side sills 18, while the middle pulley 67 is suitably mounted upon closure 57. The pulleys 65 being mounted upon the stationary cylinder structures and the ends of the cables 64 being attached to the movable plungers 26, the shiftable element will be moved transversely so as to withdraw the plate 50 from the hooked latch 48 whenever the impact bumper strikes an object.

My invention further involves means whereby to lock the gate structure in protective position. To this end, I provide connecting rods 69 which are pivoted at 70 to the brackets 45 on which the traction wheels are mounted, and at 71 to hangers 72 which depend from the fender beams 12. These connecting rods provide means whereby to force the extension of the gate structure as it drops to the road-way and also to force the contraction thereof as it is raised to elevated position. 73 and 74 designate brace rods which are pivotally connected at 75 so as to fold like an elbow structure as indicated in dotted outline in Fig. 5, when the gate structure is in elevated position. The brace rod 74 has a threaded head 76 which is screw threaded into the open end of the cylinder 77 whose lower end is flanged at 78 around a plunger 79 pivoted at 80 to the connecting rod 69. A resistance spring 81 is imprisoned in the cylinder member 77 between the head 76 and a head 82 formed on the plunger 79. Pivoted at 83 at opposite sides of the cylinder 77 are links 84 which are slotted at 85 to play on pins 86 projecting from a locking sleeve 87 slidably fitting upon the joint connected brace rods 73 and 74. As the gate structure is moved into elevated position the locking sleeve 87 is moved upwardly to clear the pivot connection 75 and to be engaged by the spring fingers 88, attached to a support 89 arranged on the fender beam and carrying a pivot pin 90 on which the brace rod 73 is pivoted. When, under this arrangement, the gate structure drops into protective position, the locking sleeve 87 is drawn downwardly to surround the pivot or joint 75 so that the connecting rod 69 is yieldably braced with respect to the fender beam.

While I have illustrated and described the preferred form of construction for carrying my invention into effect, this is capable of variation and modication without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A safety fender construction comprising frame means; a yieldable impact bumper; a gate structure attached to the frame means by a pivotal connection and a shiftable connection; means on the frame means arranged to be operated by the yielding movement of the impact bumper for moving said shiftable connection; connecting rods pivotally connecting the gate structure with the frame means; and locking means arranged between the connecting rods and frame means, substantially as described.

2. A safety fender construction comprising frame means; a gate structure attached at one side to the frame means by a pivotal connection and supported at the other side upon a shiftable connection; cylinders with plunger members arranged on the frame means; an impact bumper carried by the plungers; and cable connections arranged between said plungers and said shiftable connection, substantially as described.

3. A safety fender construction comprising frame means; a shiftable member thereon; a gate structure pivoted to the frame means and supported by said shiftable member; plungers operatively supported on the frame means and carrying an impact bumper; and connections comprising cable means connecting the plungers with the shiftable member, substantially as described.

4. A safety fender construction comprising frame means; a member shiftably arranged thereon; a gate structure pivoted to the frame means and supported by said shiftable member so as to be dropped upon the shifting thereof; an impact bumper yieldably supported by the frame means; means connecting said bumper with said shiftable member for shifting the latter upon yielding movement of the former; and means by which to secure the gate structure in protective position when it drops, substantially as described.

5. A safety fender construction comprising frame means; a shiftable member thereon; a gate structure pivoted to the frame means and supported by said shiftable member so as to be dropped upon the shifting thereof; a pair of fixed bumpers on the frame means; an impact bumper yieldingly supported on and in advance of said fixed bumpers; and connections for employing the yielding movement of the impact bumper for shifting said shiftable member, substantially as described.

6. A safety fender construction comprising frame means; a shiftable member thereon; a gate structure pivoted to the frame means and supported by said shiftable member so as to be dropped upon the shifting thereof; said gate structure being extensible and comprising an arrangement of jointed bars for such purpose; plungers operatively arranged on the frame means and carrying an impact bumper; and means comprising cables connecting the plungers with said shiftable member, substantially as described.

7. A safety fender construction comprising frame means; a shiftable member thereon; a gate structure pivoted to the frame means and supported by said shiftable member so as to be dropped to protective position upon the shifting thereof; said gate structure comprising an arrangement of jointed bars adapted to be extended under dropping movement; connecting rods pivotally connecting the gate structure with the frame means; and locking means adapted to lock the gate structure in protective position arranged between said connecting rods and frame means, substantially as described.

8. A safety fender construction comprising frame means including a pair of fixed bumpers; connections including cylindrical devices between said fixed bumpers; plungers operatively associated with said cylindrical devices; an impact bumper carried by said plungers; a shiftable member; a gate structure held up by said shiftable member and adapted to drop to protective position on the shifting thereof; and connections for employing the impact movement of said impact bumper for shifting said shiftable member, substantially as described.

9. A safety fender construction comprising frame means; cylinders with plungers arranged on said frame means; an impact bumper carried by said plungers; a shiftable member arranged on said frame means; guiding members arranged on said cylinders and said frame means; and cables connecting said plungers with said shiftable member and passing over said guiding members, substantially as described.

10. A safety fender construction comprising frame means; cylinders with plungers arranged on said frame means; an impact bumper carried by said plungers; a shiftable member arranged on said frame means; connections comprising cable means connecting the plungers with the shiftable member whereby to shift said shiftable member upon actuation of said impact bumper; and a gate structure pivoted to said frame means and having hook means engageable over the shiftable member for holding the gate structure in elevated position; said shiftable member upon shifting movement thereof being adapted to be withdrawn from the hook means to allow the gate structure to fall into protective position, substantially as described.

11. In a safety fender construction, the combination with frame means and a gate structure pivoted thereto, of an impact bumper yieldably mounted on said frame means; a shiftable member having anti-friction mounting upon the frame means and holding up the gate structure; and an operative connection between said impact bumper and shiftable member by which to shift the shiftable member and drop the gate structure upon engagement of the impact bumper with an object, substantially as described.

12. In a safety fender construction, the combination with frame means and a gate structure supported thereon and adapted to be dropped into protective position, of connecting rods connecting the gate structure with the frame means; jointed braces pivotally connecting the connecting rods with the frame means and adapted to be extended when the gate structure drops into protective position; and means for locking said braces in extended position, substantially as described.

In testimony whereof I have signed my name to this specification.

WILLIAM E. O'BRIEN.